United States Patent [19]
Blevins

[11] Patent Number: 5,243,366
[45] Date of Patent: Sep. 7, 1993

[54] BIFOCAL LENS APPARATUS

[76] Inventor: Thomas H. Blevins, 2109 Ridge Top Dr., New Port Richey, Fla. 34655

[21] Appl. No.: 819,980

[22] Filed: Jan. 13, 1992

[51] Int. Cl.$^5$ .......................... G02C 7/08; G02C 7/02
[52] U.S. Cl. ........................................ 351/57; 351/61
[58] Field of Search .................. 351/54, 55, 57, 58, 351/59, 61, 60, 158

[56] References Cited
U.S. PATENT DOCUMENTS 674,203  5/1901  Gates ...................................... 351/57

FOREIGN PATENT DOCUMENTS 38835  7/1936  Netherlands .......................... 351/57

Primary Examiner—Rodney B. Bovernick
Attorney, Agent, or Firm—Leon Gilden

[57] ABSTRACT

An eyeglass assembly includes arrangement for receiving a further magnification lens to selectively afford a rear surface of the eyeglass lens. The further magnification lens relative to each eyeglass lens may be adherably or magnetically secured relative to the eyeglass lens for providing enhanced magnification relative to the eyeglass lens.

4 Claims, 4 Drawing Sheets

BIFOCAL LENS APPARATUS

BACKGROUND OF THE INVENTION

1. Field of the Invention

The field of invention relates to eyeglass apparatus, and more particularly pertains to a new and improved bifocal lens apparatus wherein the same is arranged for securement adjacent an eyeglass lens for enhanced magnification.

2. Description of the Prior Art

The use of eyeglass lens structure, and more particularly bifocal lens apparatus, is frequently costly and unnecessarily duplicative of existing eyeglass structure. In an attempt to provide for an efficient manner of including a bifocal lens structure relative to an existing eyeglass assembly, the instant invention sets forth an additive lens member to be secured relative to an existing eyeglass lens of an eyeglass assembly. Prior art eyeglass lens apparatus including a need for bifocal lens structure is exemplified in the U.S. Pat. Nos. 4,881,805; 4,704,016; 4,830,481; and 4,923,296.

The prior art has heretofore failed to present a manner of additively presenting a bifocal lens to an existing eyeglass structure and in this respect, the present invention substantially fulfills this need.

SUMMARY OF THE INVENTION

In view of the foregoing disadvantages inherent in the known types of eyeglass apparatus now present in the prior art, the present invention provides a bifocal lens apparatus wherein the same is arranged for a selective positioning of a bifocal lens structure relative to an existing eyeglass apparatus. As such, the general purpose of the present invention, which will be described subsequently in greater detail, is to provide a new and improved bifocal lens apparatus which has all the advantages of the prior art bifocal lens apparatus and none of the disadvantages.

To attain this, the present invention provides an eyeglass assembly arranged for receiving a further magnification lens to selectively afford a rear surface of the eyeglass lens. The further magnification lens relative to each eyeglass lens may be adherably or magnetically secured relative to the eyeglass lens for providing enhanced magnification relative to the eyeglass lens.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bifocal lens apparatus which has all the advantages of the prior art bifocal lens apparatus and none of the disadvantages.

It is another object of the present invention to provide a new and improved bifocal lens apparatus which may be easily and efficiently manufactured and marketed.

It is a further object of the present invention to provide a new and improved bifocal lens apparatus which is of a durable and reliable construction.

An even further object of the present invention is to provide a new and improved bifocal lens apparatus which is susceptible of a low cost of manufacture with regard to both materials and labor, and which accordingly is then susceptible of low prices of sale to the consuming public, thereby making such bifocal lens apparatus economically available to the buying public.

Still yet another object of the present invention is to provide a new and improved bifocal lens apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
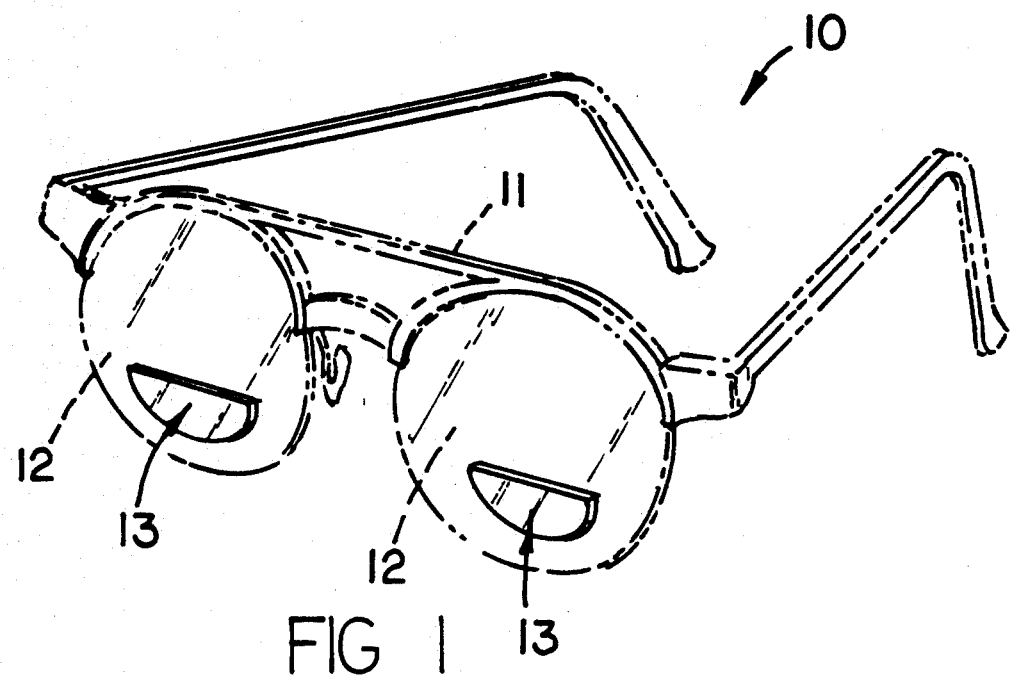
FIG. 1 is an isometric illustration of the instant invention.

With reference now to the drawings, and in particular to FIGS. 1 to 9 thereof, a new and improved bifocal lens apparatus embodying the principles and concepts of the present invention and generally designated by the reference numerals 10, 10a,10b, and 10c will be described.

Figure 2:
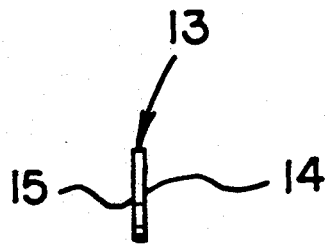
FIG. 2 is an orthographic side view of the further magnification lens utilized by the invention.
Figure 3:
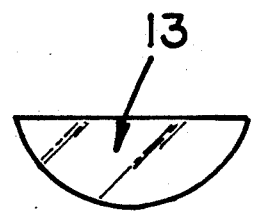
FIG. 3 is an orthographic frontal view of the eyeglass lens structure.

More specifically, the bifocal lens apparatus 10 is arranged in combination with an eyeglass assembly, including an eyeglass frame 11, with the eyeglass frame 11 including a plurality of eyeglass lenses 12 defined by a first magnification secured within the eyeglass frame. The FIGS. 1 through 3 illustrate the use of a single further magnification lens 13 defined by a second magnification cooperative with a first magnification, of a generally semi-cylindrical configuration, including a forward surface 14 spaced from a rear surface 15, with the rear surface 15 optionally including an adhesive layer coextensive therewith, wherein the adhesive is of a transparent nature and adherable to the outer surface of the eyeglass lens 12. It should be noted that alternatively the forward surface 14 may be provided with the adhesive layer for such securement to the eyeglass lens 12 and to an interior surface thereof.

Figure 4:
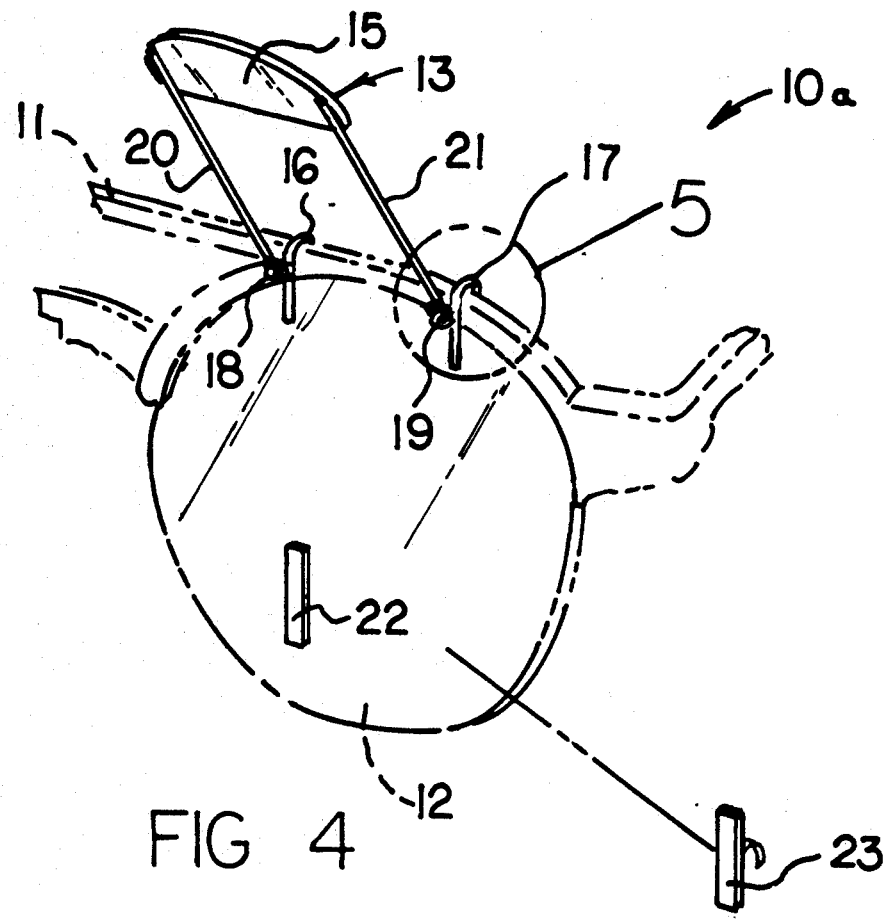
FIG. 4 is an isometric illustration of a modified manner of securement of the further magnification lens.
Figure 5:
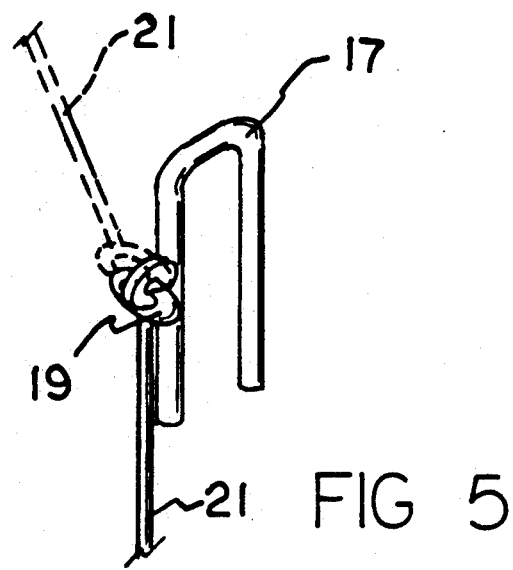
FIG. 5 is an enlarged isometric illustration of section 5 as set forth in FIG. 4.
Figure 6:
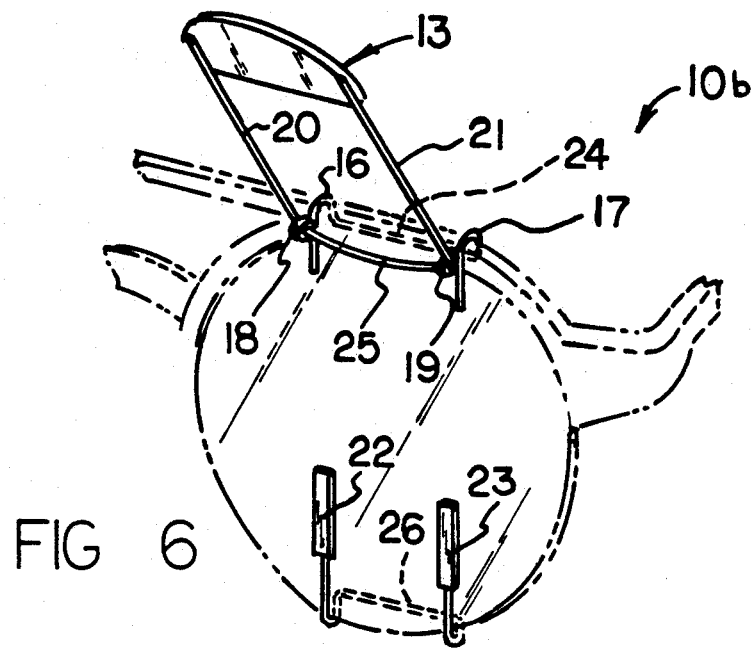
FIG. 6 is an isometric illustration of a yet further modification of the instant invention.
Figure 7:
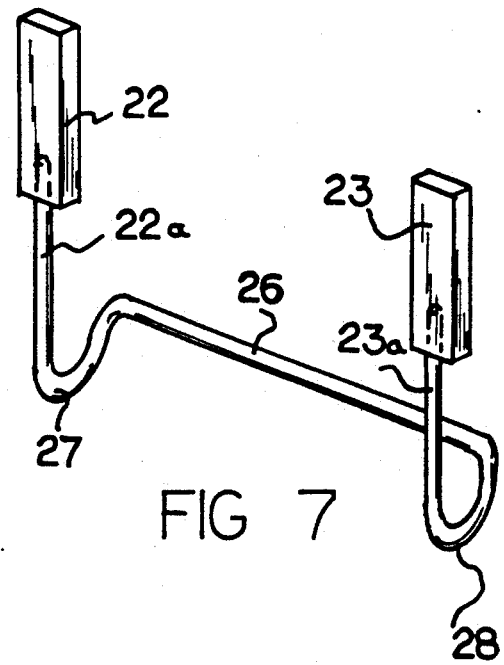
FIG. 7 is an isometric illustration of the lower bracket structure utilized by the invention.
Figure 8:
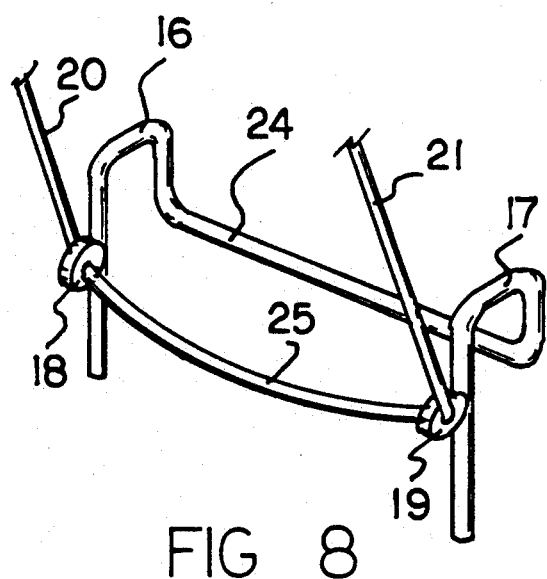
FIG. 8 is an isometric enlarged illustration of the further magnification lens support bracket structure.

The apparatus 10a, as illustrated in the FIGS. 4 and 5, illustrates an alternative manner of mounting the further magnification lens 13 relative to the forward surface of an associated eyeglass lens 12. It should be noted that the construction as illustrated in FIG. 6, is duplicated to each lens, wherein for purposes of illustration, it is believed that only reference to one such lens need be illustrated for understanding thereof.

A respective first and second "U"shaped support 16 and 17 including spring-biased legs of each support engage an upper edge of the eyeglass frame 11. The forward leg of each respective first and second "U"-shaped support 16 and 17 extending along an exterior surface of an associated eyeglass lens 12 includes a respective first and second loop member 18 and 19 secured thereto. The first and second loop members 18 and 19 pivotally mount a respective first and second ferrous leg 21 and 22. The first and second legs are arranged parallel and coextensive relative to one another spaced apart a predetermined spacing. A respective first and second magnetic strip leg 22 and 23 is mounted to the exterior surface of the lens 11 utilizing an adhesive, as illustrated in the FIG. 4, wherein the first and second magnetic strip legs 22 and 23 are spaced apart the predetermined spacing. The FIG. 6 illustrating the apparatus 10b includes a first interconnecting link 24 extending between a rear leg of each respective first and second "U"shaped support 16 and 17 to secure the first and second "U"shaped supports together and maintain their geometric and spatial relationship. A second interconnecting link 25 securing rear distal ends of the first and second ferrous legs 20 and 21 together is of an arcuate configuration that is oriented in a coplanar relationship relative to the first and second legs 22 and 23 to maintain the first and second legs and the associated further magnification lens 13 in a raised orientation. The raised orientation is effected by abutment of the arcuate with the forward surface of the lens requiring deflection of the second interconnecting link 25 when directed across the exterior surface of the lens 12 when directing the first and second leg members 22 and 23 downwardly. Further, in the apparatus 10b, a first and second spring-biased loop 27 and 28 respectively mounts respective first and second magnetic strip legs 22 and 23, with the first and second spring-biased loops 27 and 28 engaging the lower edge of the lens therewithin, with a third interconnecting link 26 connecting the first and second spring-biased loops 27 and 28 together in the predetermined relationship defining the predetermined spacing therebetween the first and second magnetic strip legs 22 and 23.

Figure 9:
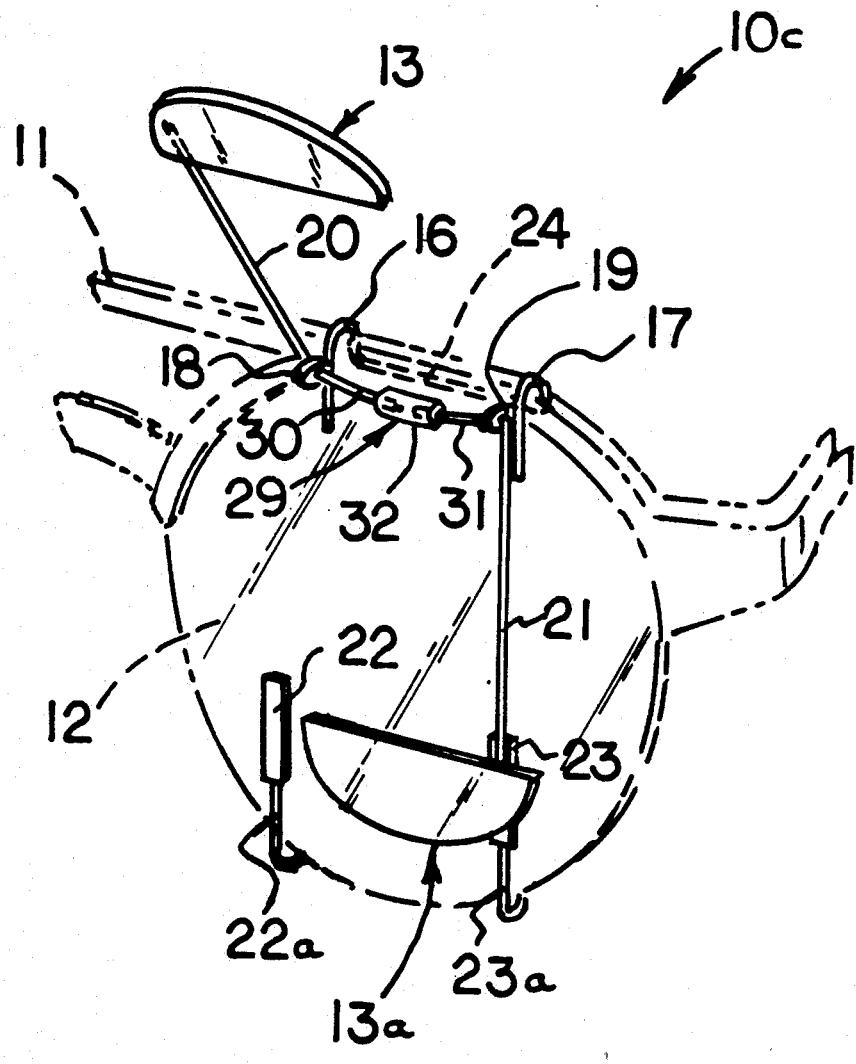
FIG. 9 is an isometric illustration of a still further aspect of the instant invention.

The apparatus 10c, as illustrated in FIG. 9, includes a modified second link 29 that is formed with a first and second link member 30 and 31 respectively mounted to the respective first and second ferrous legs 20 and 21, including a connecting collar 32 therebetween. The use of a first and second magnetic strip link 22a and 23a mounting the first and second magnetic strips 22 and 23 at upper distal ends of the first magnetic strip links 22a and 23a are spaced apart to accommodate a further magnification lens 13 and a second further magnification lens 13a mounted to the respective first and second ferrous legs 20 and 21. The lenses 13 and 13a are of reduced width but are of varying magnification to permit the use of a trifocal type structure permitting various combinations of magnification with use of the lenses 13 and 13a individually with the lens 12. The first and second second link members 30 and 31 permit selective rotation of the respective first and second ferrous legs 20 and 21 relative to the first and second loop members 18 and 19 respectively.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A bifocal lens apparatus, comprising, an eyeglass frame, the eyeglass frame including at least one eyeglass lens, the eyeglass lens of a first magnification, and a further magnification lens of a second magnification, and securement means for selectively securing the further magnification lens adjacent the eyeglass lens, and securement means includes a first "U"shaped support and second "U"shaped support mounted to the eyeglass frame and to the eyeglass lens, and wherein the first "U"shaped support and the second "U"shaped support are spaced apart a predetermined spacing, and the first "U"shaped support includes a first forward leg extending over a forward surface of the eyeglass lens and the second "U"shaped leg includes a further forward leg positioned over the forward surface of the eyeglass lens, and a first loop member mounted to the forward leg and a second loop member mounted to the further forward leg, and a first ferrous leg pivotally mounted to the first loop member, and a second ferrous leg mounted to the second loop member, and magnification means mounted to the first ferrous leg and the second ferrous leg for positioning over the forward surface of the eyeglass lens, wherein the magnification means includes the further magnification lens, and a first magnetic strip secured to a first magnetic strip link, and a second magnetic strip secured to a second magnetic strip link, wherein the first magnetic strip link is secured to a second spring-biased loop, wherein the first magnetic strip and the second magnetic strip are spaced apart the predetermined spacing in contiguous communication with the forward surface of the eyeglass lens.

2. An apparatus as set forth in claim 1 wherein the magnification means includes the further magnification lens mounted to the first ferrous leg and including a second further magnification lens mounted to the second ferrous leg, wherein the first ferrous leg is arranged for magnetic attraction to the first magnetic strip, and the second ferrous leg is arranged for magnetic attraction to the second magnetic strip.

3. An apparatus as set forth in claim 2 wherein the first ferrous leg includes a first second link member mounted substantially orthogonally relative to the first ferrous leg, and the second ferrous leg includes a second second link member orthogonally mounted to the second ferrous leg, and a connecting collar receiving the first second link member and the second second link member rotatably therewithin to permit selective rotation of the first second link member and the second second link member relative to one another 4. An apparatus as set forth in claim 3 wherein said first "U"shaped support and said second "U"shaped support includes a first interconnecting link extending between the first loop member and the second loop member to maintain the first loop member and the second loop member in a predetermined spatial relationship relative to one another.

* * * * *